(12) United States Patent
Talley et al.

(10) Patent No.: US 8,160,623 B1
(45) Date of Patent: Apr. 17, 2012

(54) REDIRECTION OF SMS MESSAGES TO SATELLITE RADIO FOR DELIVERY

(75) Inventors: Ryan Sanford Talley, Overland Park, KS (US); Christopher Michael Yenney, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 300 days.

(21) Appl. No.: 12/423,701

(22) Filed: Apr. 14, 2009

(51) Int. Cl.
*H04W 4/00* (2009.01)

(52) U.S. Cl. .................. 455/466; 455/435.1; 455/435.2; 370/329; 370/330; 370/331; 379/88.22; 379/88.25; 709/206; 709/207

(58) Field of Classification Search .................. 455/445, 455/466, 433, 412.1, 412.2, 458, 427, 428, 455/429; 379/88.13, 88.22, 88.25; 709/206, 709/207; 370/329–331
See application file for complete search history.

(56) References Cited

U.S. PATENT DOCUMENTS

| | | | | |
|---|---|---|---|---|
| 5,596,624 A * | 1/1997 | Armbruster et al. | ....... | 455/435.1 |
| 5,999,525 A * | 12/1999 | Krishnaswamy et al. | .... | 370/352 |
| 6,008,589 A * | 12/1999 | Deng et al. | ................ | 315/209 R |
| 6,188,885 B1 * | 2/2001 | Kolev et al. | ................... | 455/413 |
| 6,223,045 B1 * | 4/2001 | Valentine et al. | ............. | 455/466 |
| 6,535,746 B1 * | 3/2003 | Yu et al. | ........................ | 455/466 |
| 6,954,642 B2 * | 10/2005 | Chambers et al. | ......... | 455/435.1 |
| 7,113,768 B2 * | 9/2006 | Hundscheidt et al. | ..... | 455/412.1 |
| 7,650,136 B2 * | 1/2010 | Schnabel | .................... | 455/404.1 |
| 7,729,687 B2 * | 6/2010 | Nguyen et al. | ................ | 455/415 |
| 7,752,259 B2 * | 7/2010 | Weiser et al. | ................. | 709/203 |
| 8,046,013 B1 * | 10/2011 | Zhang et al. | .................. | 455/466 |
| 2006/0294204 A1 * | 12/2006 | Kotzin | .......................... | 709/218 |
| 2008/0045216 A1 * | 2/2008 | Mousseau et al. | ......... | 455/435.3 |
| 2008/0268882 A1 * | 10/2008 | Moloney | ....................... | 455/466 |
| 2009/0186596 A1 * | 7/2009 | Kaltsukis | .................. | 455/404.2 |

FOREIGN PATENT DOCUMENTS

WO 01/33892 A1 5/2001

* cited by examiner

*Primary Examiner* — Kamran Afshar
*Assistant Examiner* — Gerald Oliver

(57) ABSTRACT

Methods, media, and systems are provided for delivering short messaging service (SMS) messages via a satellite radio network are provided. A cellular-satellite gateway (CSG) server is coupled to both the network of a terrestrial cellular telecommunications provider and to the network of a satellite radio provider. Once a requisite number of unsuccessful attempts for delivery have been made by the elements of the cellular network, the SMS message is forwarded to the CSG server. The CSG sends the text message to a specified satellite radio network. The satellite radio network broadcasts the text message so that it may be received by a satellite radio enabled device. Messages are filtered at the mobile device to ensure only the intended recipient receives the text message. Acknowledgment is sent the next time the mobile device connects to its cellular network.

16 Claims, 5 Drawing Sheets

REDIRECTION OF SMS MESSAGES TO SATELLITE RADIO FOR DELIVERY

SUMMARY

The present invention is defined by the claims below, but in brief, methods, media, and systems provide for delivering short messaging service (SMS) messages via a satellite radio network. Typically, when an SMS message (e.g., text message) is sent via a telecommunications network, indications of unsuccessful delivery attempts are stored, and reattempts are periodically made. Implementations in this disclosure provide an additional ways of attempting delivery. A cellular-satellite gateway (CSG) server is coupled to both the network of the telecommunications provider and to the network of a satellite radio provider. After a number of unsuccessful delivery attempts, the SMS message is forwarded to the CSG server situated between the networks. The CSG server sends the text message to a specified satellite radio network, which broadcasts the text message so that it may be received by a satellite-radio-enabled device. There are a variety of ways that the receiving device can determine if a particular text message is intended for that device and display it accordingly.

In a first aspect, computer-readable media are provided with embodied computer-executable instructions for performing a method of delivering SMS messages through channels on a satellite radio network when a user is not available on a telecommunications network are provided. The method includes receiving by way of a user's home telecommunications network an SMS message that is directed to the user. Delivery of the SMS message is attempted for a predetermined period of time. When delivery is successful, the message is deleted as is usually the case. However, when delivery is not successful, the SMS message is communicated to a satellite radio network and broadcast on that network.

In a second aspect, we describe a way of communicating SMS messages. A CSG server receives an SMS message. The CSG server is coupled to a telecommunications network and to at least one satellite radio network. The SMS message is received at the server by way of the telecommunications network. The CSG server determines a satellite radio network that should receive and broadcast the SMS message and communicates the message to the determined satellite radio network.

In a third aspect, a system for receiving SMS messages at a mobile device via a satellite radio network when telecommunications services are not available, through a telecommunication network. The system includes a mobile device configured to receive satellite radio broadcasts. The system also includes at least three components. One component is a reception component configured to receive SMS messages. Another component is a destination determination component configured to determine if an SMS message is intended for the mobile device. The system also includes a display component configured to display the SMS message if the SMS message is intended for the mobile device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
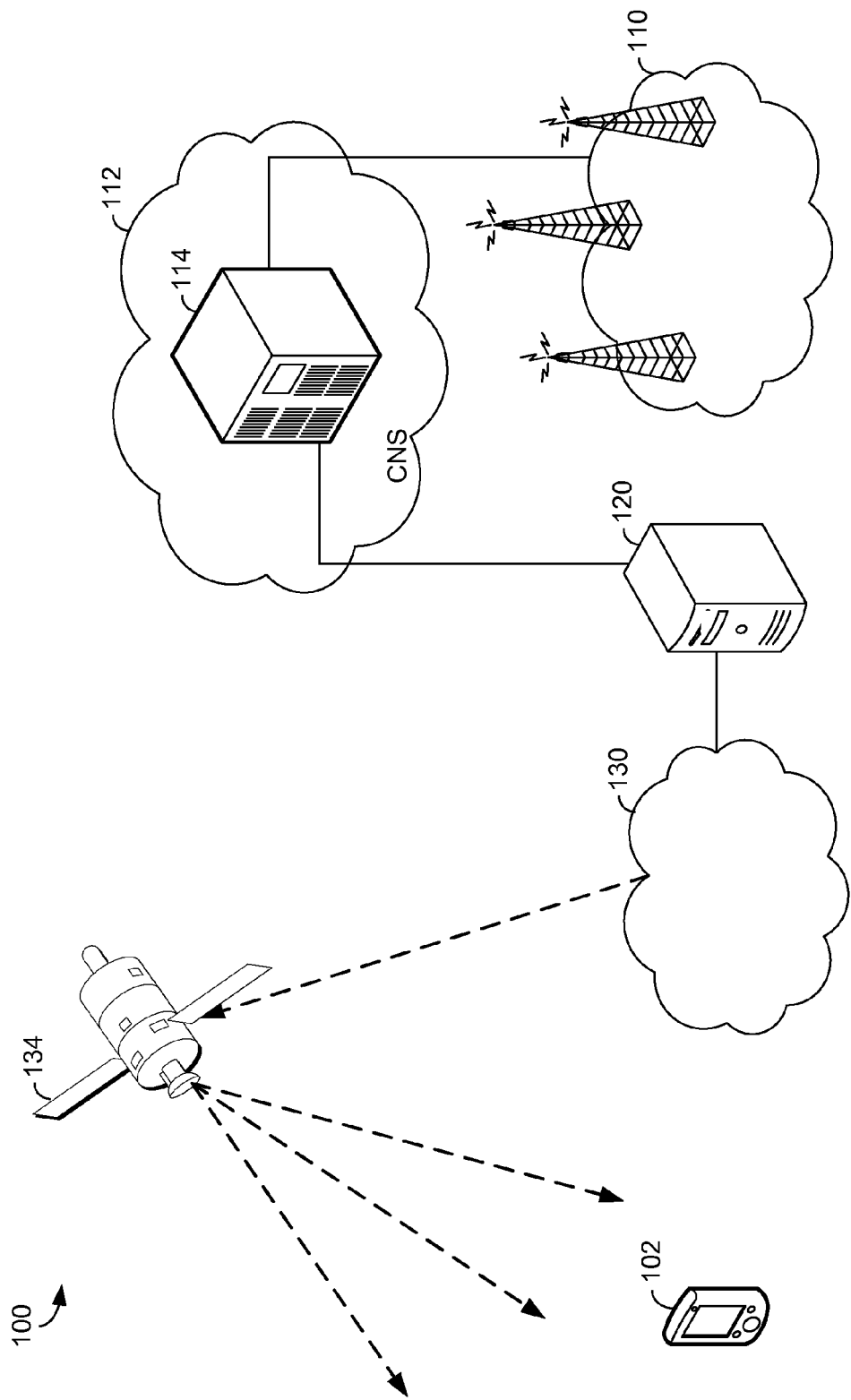
FIG. 1 depicts an exemplary environment for delivering short messaging service (SMS) messages via a satellite radio network.

The following descriptions provide systems, media, and methods for delivering short messaging service (SMS) messages via a satellite radio network. Because of advances in mobile device keyboards, expansion of service plans, and situations where texting has become more convenient, the use of text messages has increased exponentially in recent years. No longer the domain strictly of teenagers, there are more users than ever in addition to the flood of text messages themselves. An SMS message includes an item sent by way of a messaging protocol that is frequently associated with a mobile devices, although messages can be sent from a computer, laptop, or other means. SMS messages include messages sent and received according to a protocol that is part of the Global Systems for Mobile (GSM) communications protocol for example. This is typically point-to-point-styled traffic, that is sent from one device to another device, and is sent message by message. There are other protocols that encompass advertising or multicast-oriented cellular broadcast text messages. However, the term SMS has become synonymous with any type of text message (including, for example, messages sent via CDMA or other protocols). It is this broader meaning of the term that will be used for this description.

Text messages are sent as packet-based traffic, being stored at an SMS controller (SMSC), at least momentarily, before being sent to their intended recipient. The SMSC is the server that directs traffic for the network with regard to text messages, and might be known by various names. We contemplate any device that can provide SMSC functionality. Usually when an SMS message (again, not to be exclusive of any type of text message) is sent via a telecommunications network, unsuccessful delivery attempts lead to continued storage on the SMSC. The delivery of the message then is reattempted periodically. The duration that an SMS message is kept while delivery is reattempted, as well as the frequency with which reattempts are made, can vary from telecommunications provider to provider. As an example, a network provider could establish 72 hours as a minimum time to keep undelivered messages, while reattempting delivery every three hours, for a total of 12 reattempts at delivery in three days.

When a mobile device is unable to receive text messages, such as when outside of a user's home network coverage, the above and below descriptions detail how the coverage capabilities of a satellite radio provider can be leveraged to facilitate such delivery. Once the provider has attempted to deliver the message the provider's specified number of times and remains unsuccessful, previous practice was to delete the message from storage forever to remain unsuccessful. The descriptions of this disclosure allow text messages to be delivered to areas not serviced by cellular towers, as messages can be delivered via broadcast satellite.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ASN | Access Services Network |
| BS | Base Station |
| BSC | Base Station Controller |
| CSG | Cellular-Satellite Gateway |
| CSN | Connectivity Services Network |
| ESN | Equipment Serial Number |
| GPS | Global Positioning Satellite |
| GSM | Global System for Mobile communications |
| IP | Internet Protocol |
| MDN | Mobile Directory Number |
| MEID | Mobile Equipment Identifier |
| QoS | Quality of Service |
| SMS | Short Messaging Service |
| SMSC | Short Messaging Service Controller |

Further, various technical terms are used throughout this description. An illustrative resource that fleshes out various aspects of these terms can be found in Newton's Telecom Dictionary by H. Newton, $22^{nd}$ Edition (2006).

As one skilled in the art will appreciate, implementations of the following descriptions may be embodied as, among other things: a method, system, or computer-program product. Accordingly, the implementations may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The descriptions above and below are directed to delivering SMS messages via satellite radio networks when a message is not deliverable to a user's mobile device for a predetermined amount of time. In a terrestrial cellular telecommunications environment, there are two types of subnetworks in use, which may also be thought of as portions of the overall network. The first is an access services network (ASN), which a user utilizes to gain entry onto a network. This is the network portion used to send or receive an SMS message, or complete any other transaction on the network (i.e., complete a phone call, browse the internet, etc.). There can be just one access service network, but the typical telecommunications network will employ a number of ASNs. An ASN includes equipment such as cellular towers, base transceiver stations, and equipment to route communications onto, within, and off of the network.

The second portion of the network is a connectivity services network (CSN), that serves as the core transport between access service networks and other networks. The equipment that is normally associated with such transport includes but is not limited to routers, switches, repeaters, and a host of differing types of servers. These elements and others on the CSN allow calls, messages, and other information to traverse from one point on the network to another. This enables circuit-based traffic (voice sessions), packet-based connections (e.g., messaging, VoIP, etc.), or for various administration and billing functions carried out by the network provider (authentication and authorization, billing, and so forth). Some telecommunications providers have peering agreements with other network providers. This results in a more direct connection between the two competing networks, where the CSN may direct all traffic intended for a competitor network through particular points in the CSN for egress (and ingress) purposes.

To send an SMS message in a terrestrial cellular network, a first device transmits the message via an access services network to a second device. The intended recipient, the second device, may receive the message through traversing the same access network, the same provider's network through the CSN, or a different network altogether by way of the provider's network. A short message service controller (SMSC) on the transmitting network receives the text message from the first device. The SMSC looks up the address used to deliver the text message, which enables the message to be routed and delivery to be attempted to the second device. If the intended recipient is on the provider's network, routing is less complicated because all routing can take place on the network. The message is routed by way of a point code, which denotes the switch to which the message should be sent so that the message can be completed.

When an attempt is made on the terrestrial cellular network, the SMSC awaits an acknowledgement that the text message has been delivered. This confirmation is sent from the receiving device, notifying the SMSC on the network from which the text is sent that all necessary information was received in order to complete the message. When this happens, the SMSC can then delete the message. However, when the text message cannot be delivered, there is no delivery confirmation. In this case, the message is stored and queued at the SMSC. The SMSC then retransmits the message at a predetermined interval. Retransmission takes place until a delivery confirmation is received, or until a time period for retransmission has passed. If the retransmission period ends without ever receiving acknowledgement that the message has been delivered, then the message is deleted.

The final attempt by the SMSC does not need to be last opportunity to deliver the text message. Instead of deleting the message, this final attempt at terrestrial delivery can be followed by transmission to a server, which for the purposes of this disclosure will be called the cellular-satellite gateway (CSG). The CSG is coupled to the telecommunications network, but is also coupled to the network of a satellite radio provider. By transmitting the SMS message to the gateway, the message can be sent for transmission on the satellite radio network, covering areas unreached by the cellular network. A satellite radio enabled mobile device would then be able to receive messages via conventional means when appropriate, but via the satellite radio broadcast means at other times as will be outlined below.

Because of the differences between broadcast radio transmission and point-to-point communications of the cellular network, the logic needed to broadcast the message is different than that of the terrestrial network. One aspect of the following disclosure is the CSG's ability to reformat the message so that it may be broadcast over the satellite radio provider's system. There will be header information included in the message necessary for transmission on a cellular network that is irrelevant for broadcast transmission. Conversely, there will be information that must be added in order for the satellite radio network to transmit the message and have it received correctly by the mobile device.

Another aspect of the succeeding description is the broadcast of appropriately encrypted information so that only the intended recipient receives the message. Without a way to differentiate the messages, devices would receive every text message broadcast on the satellite radio network. Advantageous features of this disclosure include implementing the reformatting and the encryption in a manner that most efficiently directs the text message to the user. This can be accomplished in different manners, such as through geographic distribution of the broadcasts, through quality-of-service identifiers, or other ways that will be apparent in light of this description.

Yet another aspect of this disclosure is the mobile device's ability to examine and discard text messages that are not directed to that device. Without a filtering mechanism of some sort, mobile devices would receive all messages that are broadcast by the satellite radio provider. This would create an obvious situation where users would not agree to allow broadcast of their text messages. It would also be wasteful of handset resources, as a geographic area could have hundreds or thousands of texts sent over a given time period. Additionally, in the event that messages are rebroadcast a given number of times to try and ensure delivery, redundant messages may be sent. Coordination then of mobile handset capabilities with the network resources available on both terrestrial and satellite networks remedies this situation.

Between the SMSC and the cellular-satellite gateway, several options are available with regard to implementing the described methods, media, and systems. One available method of sending the text message for broadcast over the satellite radio network would be a pass-through oriented implementation. Using this technique, the message is simply converted and not kept at the gateway. In this instance, the SMSC sends the text message through the CSG for reformatting, but one of two results occur afterwards. If the message is only to be broadcast one time, as a last ditch effort at delivery, a pass-through would eliminate the need for any additional storage of the message. No need for storage also is the case on a last attempt at satellite delivery, even if the message previously had been retained for later attempts.

As a more likely scenario, there will be additional attempts on the satellite network as there was on the terrestrial network. If there are additional attempts to be made in the future, the SMSC can continue to store the message. This allows the controller to maintain tracking functions to see if the message has been delivered and if other subsequent attempts are appropriate. After a certain period of time, or upon the last attempt, the message could be deleted regardless of delivery acknowledgement. Because no confirmation could be sent at the actual time of delivery based on the one-way nature of satellite radio communications, confirmation would be a bit more complex for this form of delivery. Instead of acknowledgement at the time of reception, the mobile device would need to send an acknowledgement the next time it is on the terrestrial network. In the event the message had not been deleted, this would preclude any further attempts and save storage space (i.e., conserve network resources).

Another variant would be to forward the message on to the CSG, which would then be the responsible element for storage. In this manner, resources on the terrestrial network could be conserved. Because the terrestrial component of delivery would no longer be an option, this could be an intuitive method for shifting the message from the cellular network, to an element that is somewhere between the terrestrial and satellite networks. Storage at the CSG would also allow for reformatting to take place once, so any loss due to storage could be countered with less computations (conversions) taking place on multiple rebroadcasts. Storing the message, converted or not, would also provide a failsafe when messages are to be rebroadcast on the satellite radio network and communication is not available between the CSG and the cellular network. Once the message has been passed from the CSN to the satellite network, operation of the CSN becomes irrelevant.

One aspect of this system in any way it is implemented is the implicit need for information sharing between the cellular network provider and the satellite radio provider. The cellular network will need to know what satellite service the user of the mobile device subscribes to in order that the text message be broadcast over a network to which the mobile device has access. The cellular network should also know what information to pass along with the message in order that it may be broadcast (such as an identifier for the device, a home area, a last known location, etc.). The satellite provider will need to know information about the mobile devices so that the proper frequencies can be used as well. The number and frequency of attempts as well as numbers of undelivered messages will need to be known for storage purposes wherever storage occurs.

In the figures and succeeding descriptions, like numbering will be used where possible. Turning now to FIG. 1, there is depicted an exemplary environment 100 for delivering short messaging service (SMS) messages via a satellite radio network. Environment 100 is greatly simplified in a number of aspects that will be apparent from the above and below descriptions. One portion of environment 100 is a terrestrial cellular access services network (ASN) 110. ASN 110 is shown without including a number of components so as to not obscure the present invention. What is shown but not numbered are cellular towers of a conventional nature. These towers can include base transceiver stations (BTS) that send and receive cellular transmissions. The transmissions that can be sent and received include SMS or text messages.

Access services network 110 is logically coupled to a connectivity services network (CSN) 112 such that text messages and other communications can be sent back and forth between the two portions of the network. CSN 112 has a number of components to provide core network transport. Like ASN 110, many of these component parts are omitted so as not to obscure the invention. The multitude of components can include routers, switches, repeaters. multiplexers, servers, and other elements that allow for message transport.

CSN 112 has at least one application server 114 that handles text message service originating from the network. Application server 114 can direct text messages for delivery on the network or for transmission to a different network. According to certain implementations, server 114 also receives text messages that are not delivered to their intended recipients within a certain period of time. After this period of time, undelivered messages are sent to a cellular-satellite gateway (CSG) 120. CSG 120 is logically coupled to both network 112 and network 130 and is configured to reformat the text message so that it can be broadcast by satellite radio network 130.

Satellite radio network 130 has been depicted as a cloud to convey the idea that the particular elements of the network and how messages are communicated across the network are outside the scope of the present invention. Specific components or structures are not necessary as long as the network can transmit the SMS message to a satellite 132 for broadcast. As described previously, the information necessary for formatting the text message on the satellite radio network can be completed at CSG 120 on a pass-through basis, or the formatted message can be stored there for subsequent retransmission.

A mobile device 102 is shown that can receive the text message anywhere in the broadcast area of satellite 132. Mobile device 102 likely has the ability to filter messages as described below, or in some similar manner. Thus, while broadcast throughout the satellite's effective area, mobile device 102 will only receive and decode those messages intended for it. A number of filtering options are available as described with respect to FIG. 5 below.

In order to further target delivery, the satellite radio network, the cellular network, and the CSG may work in concert to help target the message delivery. For example, the satellite radio network may employ multiple satellites to cover a broader geographic area than can be covered with a single satellite. The intended receiving mobile device to which the message is attempted to be sent can be targeted based on the geographic distribution of these satellites. One way that this can be done in the United States is through the use of the North American Numbering Plan area codes. Each satellite would have area codes associated with them. Thus, the appropriate satellite could be selected on the area code of the intended recipient.

Likewise, the CSN can provide information regarding the switch at which the mobile device was last known to be on the cellular network. Therefore, regardless of the home location based on telephone number, the attempted delivery via broadcast can be based on the (last known) physical location of the device. A combination of the two could be employed, broadcasting in the device's home area and the last known location of the device, if they are at all different.

Figure 2:
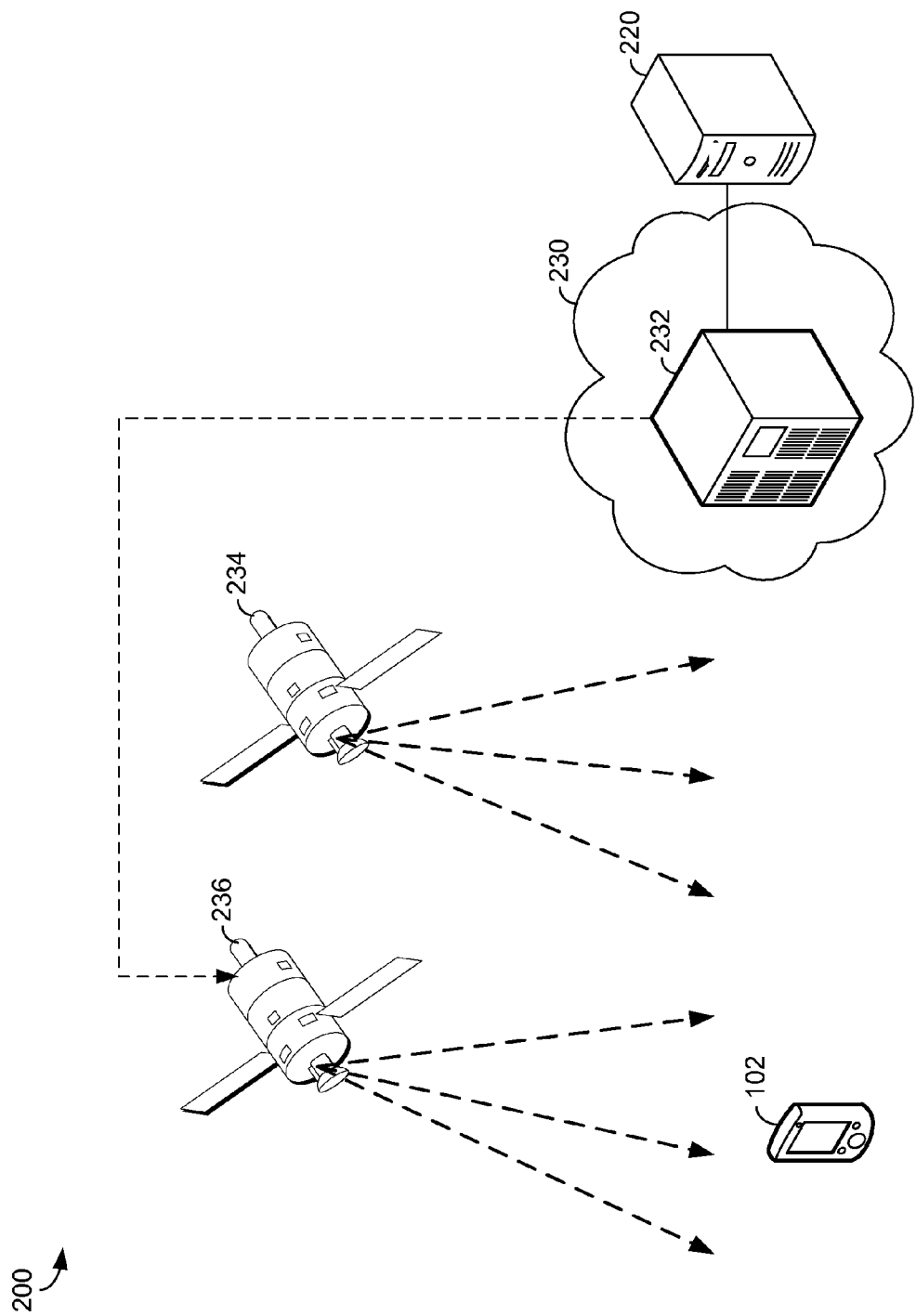
FIG. 2 shows an exemplary environment for delivering, based on geographic information, SMS messages via a satellite radio network.

Describing now FIG. 2, an exemplary environment 200 is depicted in which SMS messages can be delivered by a satellite radio network 230 based on geography. Many of the features and elements depicted are similar or substantially similar to those shown in FIG. 1. Once again, the message is received from a gateway 220 coupled to both networks. In FIG. 2, the terrestrial network from which the SMS message is delivered is not shown, but is assumed to be of a similar character as that in FIG. 1.

One difference in FIG. 2 is the inclusion of a server 232 on satellite radio network 230. Server 232 is configured to communicate with different satellites on the satellite radio network, illustratively shown as satellites 234 and 236. The implementations described are not limited to two satellites, however. In actuality, there can be many more than two satellites in communication with server 232. The specific number of satellites should not be construed as a limitation of the present invention.

Continuing with FIG. 2, server 232 determines a satellite that could best deliver the message based on geography. This can be determined based on a number of factors, such as last known location of the device, the home area of the mobile device, area codes associated with the satellite and the like. Once the "best" satellite has been determined, the satellite radio network communicates the message to the appropriate satellite and broadcasts the messages as described previously, or in a substantially similar manner.

As an alternative implementation, the satellite radio provider could broadcast based on geography of the user through use of its allocated spectrum. As an example, a provider has a certain bandwidth available over which it can broadcast. Within that bandwidth, there may be a subset of channels reserved only for text redelivery. If 98 to 98.9 Megahertz (MHz) frequencies are available in 0.1 MHz increments, then the channel at 98.0 may service broadcasts for mobile devices that have home areas in the Northeast. The frequencies at 98.1 and 98.2 may be the Southeast and Midwest regions of the country. The example continues moving east to west until the channel at 98.9, at which mobile devices registered to numbers on the West Coast are targeted. In this way, the location of the mobile device does not matter. It simply always checks the frequency for its messages based on home geography.

In light of these, and other specific technical details that must be coordinated in order for delivery to take place, the terrestrial and satellite providers will need to have more than a simple knowledge of an address of the gateway. In this way, the partnership between the terrestrial telecommunications network provider and the satellite radio network provider will be a unique one, with a specific CSG (or CSGs if needed) for that connection. However, there could be more than one satellite provider for the cellular network or vice versa. Because of this and differing technologies offered by each provider, unique CSGs would be configured for the specific exchange that would need to occur at each access point. For example, a terrestrial network could be partnered with two satellite radio providers. Satellite provider A may use frequencies to divide text delivery and broadcast the text on every satellite in the network on the appropriate frequency. Satellite provider B may use individual satellite coverage areas to divide the delivery and only send the text message to one particular satellite. Because of this, an individual CSG with a satellite-provider-specific configuration will be necessary.

Figure 3:
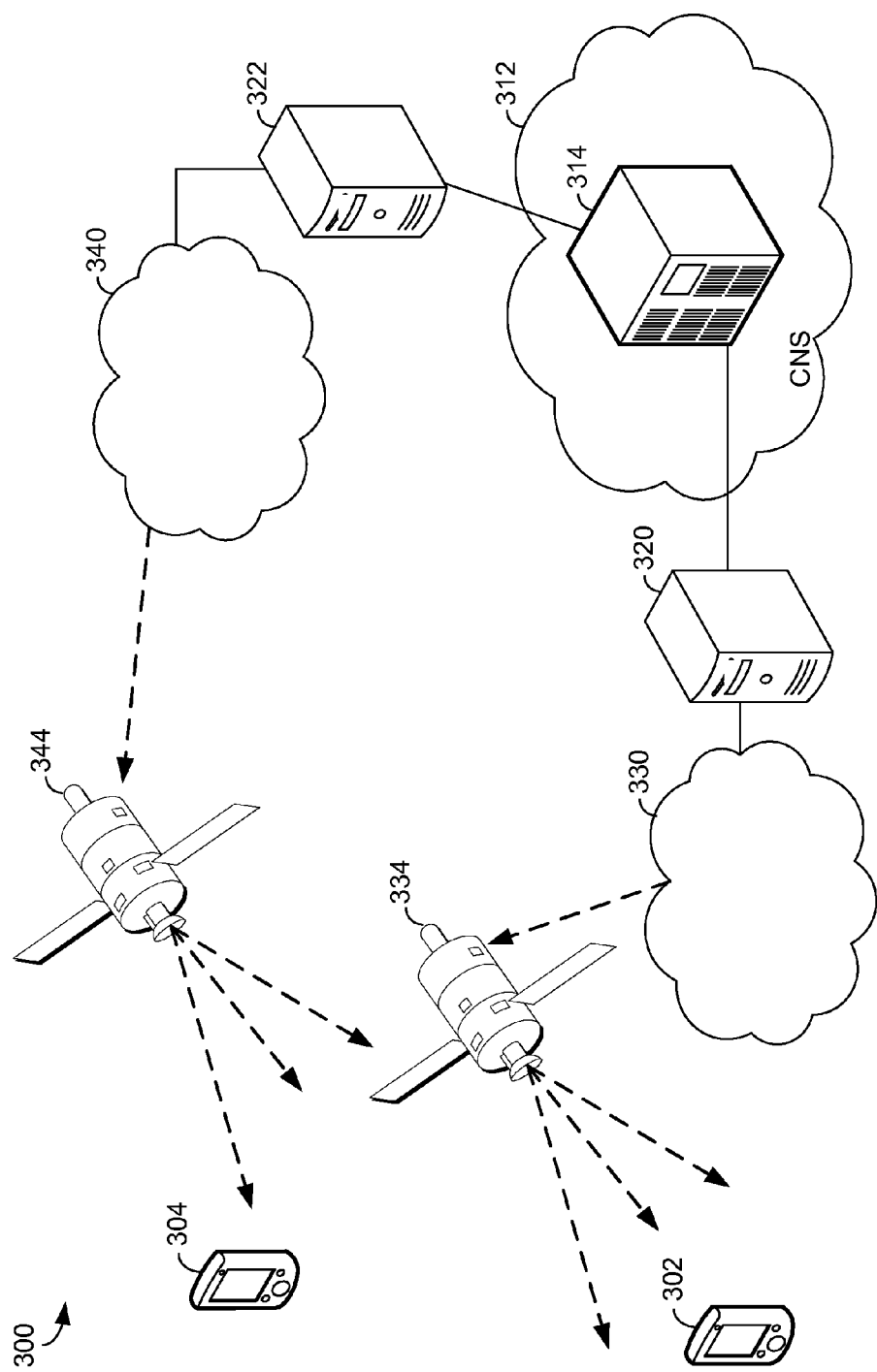
FIG. 3 depicts an exemplary environment for delivering SMS messages via a plurality of satellite radio networks.

Now with respect to in FIG. 3, an exemplary environment 300 for delivering SMS messages via a plurality of satellite radio networks is depicted. Once again, application server 314 on a terrestrial cellular network 312 is shown that is substantially similar to server 114 on network 112. Application server 314 is coupled to a CSG 320 and a CSG 322, however.

CSG 320 is also coupled to a satellite radio network 330 and can deliver the SMS message through a satellite 334 as shown above. In FIG. 3, user device 302 is a mobile device that subscribes to network 330 and thus can receive messages when device 302 is not able to receive signals from its terrestrial cellular provider. Gateway 322 is coupled to a substantially similar appearing network 340, which is configured to deliver messages via a satellite 344. This is shown to illustrate that a user 304, which subscribes to a different satellite radio provider, will receive messages through a different network. The broadcasted messages will naturally be subscriber specific and only available on networks to which the device has access.

Figure 4:
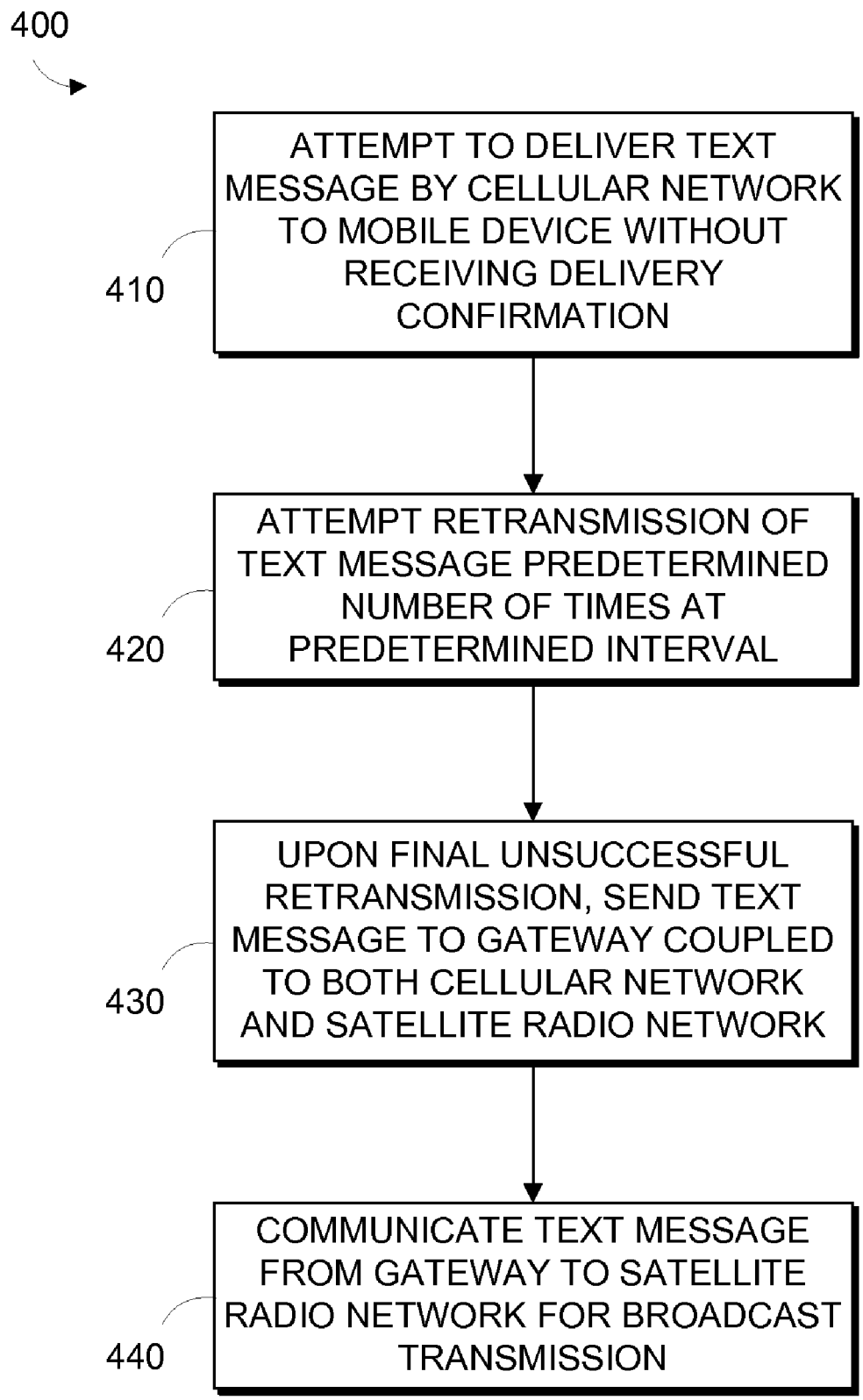
FIG. 4 is a flowchart representing a method for delivering SMS messages by way of a satellite radio network.

Turning to FIG. 4, a flowchart representing a method for delivering text messages by way of a satellite radio network is depicted. At a step 410, an attempt is made to deliver a text message by way of a terrestrial cellular network. An acknowledgment confirming delivery of that attempt is not received. Also by way of the terrestrial network, retransmission of the message is attempted a predetermined number of times at a predetermined time interval at a step 420. This would be delivery attempts as carried out by network 112 in FIG. 1 above.

Upon a final unsuccessful retransmission, the text message is communicated at a step 430 to a gateway coupled to both the cellular network and a satellite radio network. This gateway could be similar to CSG 120 seen in FIG. 1, coupled to a substantially similar network to network 130. At a step 440, the test message is communicated from the gateway to the satellite radio network for broadcast transmission. The communication and broadcast of step 440 can be implemented in a number of ways as outlined above and below.

Not all of the aspects of the implementation of such a system rely on the gateway between the networks. The mobile devices equipped to receive the text messages from a satellite radio source also play a role in the delivery. One slight difference from the normal point-to-point operation of texting on a terrestrial network will be the acknowledgment process. Because the satellite transmission is one-way broadcast only, the mobile device will be unable to send an acknowledgement when the text message is received. As a result, the mobile device would retain the acknowledgement generated upon reception of the message. Rather than send it at that time, it would be saved for later transmission to the mobile device's home terrestrial network. If the message is still stored on the SMSC, as was discussed for a pass-through implementation, the SMSC could then delete the message. If the message were to be stored on the CSG or other device on the satellite radio provider's network, the acknowledgement could be forwarded for the same purpose (of deleting the message). If the message has already been deleted at both places, for instance when the acknowledgement is sent well after the retransmission period, then the acknowledgment is discarded also.

As discussed previously, the mobile device should be able to filter messages in some way. This prevents wasteful resource consumption on devices that have improving, but limited, storage and computational resources available as a general rule. It also ensures the intended recipient is the only one to receive the message. Filtering of the messages could take a number of forms that can be determined by some combination of the cellular provider, satellite provider, or the device manufacturer. Exemplary ways in which this filtering can take place would be through comparison of a point code identifying the originating switch, a mobile directory number, an equipment serial number, or a mobile equipment identifier.

If the point code is used, the device would be able to compare the originating switch with the point code of its home switch. Without a match, the message would not be intended for the device. Each of the remaining numbers in the above list is used to identify the handset in some way, and algorithmically looking at each number could make filtering as efficient as possible. For instance, once a point code matched, meaning the device was from the same home area as the intended recipient, a comparison could then take place between one of the remaining identifiers. This handset identifier comparison will be more computationally intensive as the identifier will be a larger number denoting unique devices, compared to the limited number of point codes.

Likewise, the telephone number of the device could be used, looking first at the area code of the intended recipient, then the exchange number and finally the last four digits. As any item does not match, the message is discarded without being stored. These are exemplary identifiers and should not be construed as exhaustive or limiting in nature. Rather, they are intended to convey some of the header information that may be used to filter messages, as could many other portions of the packet header information.

Figure 5:
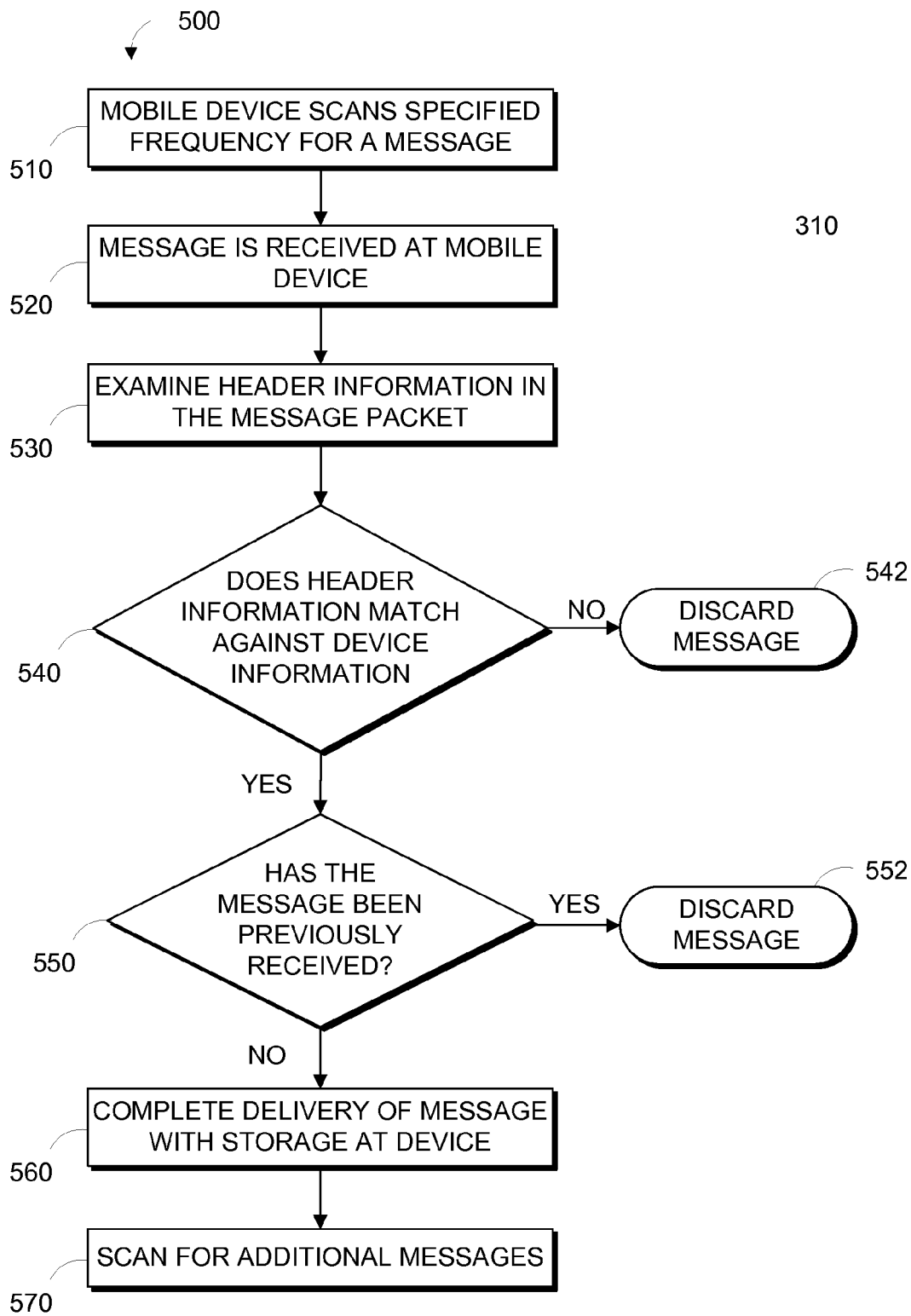
FIG. 5 is a flowchart representing a method for determining, at a mobile device, whether a text message is intended for that device.

A flowchart representing a method of filtering messages at a mobile device 500 is shown in FIG. 5. At a step 510, the mobile device checks a specified frequency for an incoming message. Again, the frequency could be specific to a geographic home area, a current geographic location, or to a particular cellular provider. The frequency could also be indicative of a guaranteed quality of service (QoS) level. This would allow those with a higher guaranteed QoS to utilize a frequency without as many devices on it, increasing efficiency of delivery and providing the promised improved service. Those with a lower QoS would have more devices accessing the frequency, and therefore would have to filter through more messages. This increased filtering would result in longer scan times to check for messages, and more difficulties in receiving messages if there are a large number of them.

The method continues when a message is received at the mobile device via a satellite radio broadcast at a step 520. Once it has been received, header information in the message's packet(s) is examined at a step 530. At a step 540, the examined information is compared against information stored on the mobile device.

Again, the header information will contain information that, unless matched, prevents the mobile device from accessing the remainder of the packet. This can be accomplished by encrypting the packet payload so that none of the text message is available to the device if there is not a match (i.e., the device is not the intended recipient). If the information does not match, the message is discarded at a step 542. If there is a match, at a step 550 the message is checked to see if it has already been received or if it is new.

At a step 552, if the message is examined and has already been received, the message is discarded. In the case when there are multiple retransmissions on the satellite network before the device connects to its home terrestrial network, this prevents message duplication. If the message is new, it is stored on the device to complete delivery at a step 560. Part of the storage process could include the aforementioned decryption of the message and generation of the acknowledgement that will be transmitted at a later time.

At a step 570, a check is made by the device to see if another message has been broadcast. If another message has been broadcast and has been received, the method repeats at a step 530. Otherwise, the device has received all currently broadcast messages and the method ends until some time in the future. Future scans could be dependent on the time of day, such as on the hour, or could be interval based (i.e., an hour from the last scan regardless of when that was). The intervals used in scanning for messages are intended to be exemplary in nature, so other timeframes between which scans can be made are up to the particular implementation.

Many different arrangements of the various components depicted, as well as components not shown, are possible without departing from the spirit and scope of the present invention. Implementations of the present invention have been described with the intent to be illustrative rather than restrictive. Alternative implementations will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media with computer-executable instructions embodied thereon for performing a method of delivering short message service (SMS) messages through channels on a satellite radio network when a mobile device is not available on a telecommunications network, the method comprising:

receiving at a terrestrial telecommunications network, an SMS message that is directed to a mobile device;

attempting delivery of the SMS message for a predetermined period of time using the terrestrial telecommunications network;

when delivery is successful, deleting the SMS message;
when delivery is not successful, communicating the SMS message to a cellular-satellite gateway (CSG) server that is communicatively coupled between the terrestrial telecommunications network and a satellite radio network, the CSG
reformatting the SMS message,
storing a reformatted SMS message in a memory,
forwarding the reformatted SMS message to the satellite radio network for broadcasting to the mobile device by the satellite radio network, and
determining a channel on which to broadcast the SMS message;
broadcasting, by the satellite radio network, the SMS message on the determined channel;
re-broadcasting the SMS message at selected time intervals for a predetermined amount of time;
deleting the SMS message from a memory associated with the terrestrial telecommunications network;
receiving an acknowledgement message from the mobile device; and
forwarding the acknowledgement message to the CSG, the CSG subsequently deleting the reformatted SMS message from the memory.

2. The media of claim 1, wherein communicating further comprises:
designating a point code for the CSG coupled to the terrestrial telecommunications network and the satellite radio network, wherein the point code is an identifier for the switch needed for delivery of the message.

3. The media of claim 1, wherein said the selected time intervals are based on a quality of service (QoS) guarantee for the mobile device.

4. The media of claim 1, wherein determining includes selecting a channel based on at least one of a geographic location, an area code of the mobile device, a last known location, and a home telecommunications network from which the SMS message was received.

5. One or more non-transitory computer-readable media having computer-usable instructions embodied thereon for performing a method of communicating short message service (SMS) messages to an intended receiving mobile device, the method comprising:
receiving a short message service (SMS) message at a cellular-satellite gateway (CSG) from a short message service controller (SMSC) by way of a telecommunications network, the CSG being coupled to the telecommunications network and to at least one satellite radio network;
determining a satellite radio network that should receive and broadcast the SMS message;
reformatting the SMS message, by the CSG, for delivery to a mobile device by the satellite radio network;
determining, by the CSG, a channel on which to broadcast the SMS message; and
communicating the SMS message to the determined satellite radio network, the satellite radio network broadcasting the SMS message on the determined channel, and re-broadcasting the SMS message at selected time intervals for a predetermined amount of time.

6. The media of claim 5, wherein determining includes examining a point code associated with the SMS message, wherein the point code is an identifier for the switch needed for delivery of the message.

7. The media of claim 6, wherein the point code is indicative of the satellite radio provider.

8. The media of claim 7, wherein the point code further is indicative of a geographic area for broadcast.

9. The media of claim 8, wherein the geographic area is based on the point code of the switch corresponding to the mobile device's last known network connection.

10. The media of claim 5, wherein a response is communicated to the telecommunications network once the mobile device has access to the telecommunications network, the response indicating that the SMS has been received by the mobile device and the telecommunications network can delete the SMS message.

11. The media of claim 5, wherein the CSG is a dedicated server between a telecommunications provider and a satellite radio provider.

12. A system, when telecommunications services are not available, for receiving short message service (SMS) messages at a mobile device via a satellite radio network, the system comprising:
a mobile device configured to receive satellite radio broadcasts from a satellite selected from a plurality of satellites on a satellite radio network based on a last-known geographic location of the mobile device;
a reception component configured to receive SMS messages;
a destination determination component configured to
determine if an SMS message is intended for the mobile device,
generate an acknowledgement message when the SMS message is intended for the device,
communicate the acknowledgement message to a short message service controller (SMSC) on a home telecommunications network of the mobile device when the home telecommunications network is next accessible, the SMSC forwarding the acknowledgement message to a cellular satellite gateway (CSG) that is communicatively coupled between the SMSC and the satellite radio network, and the CSG deleting the SMS message from a memory, and
examine an identifier associated with a quality of service (QoS) level for an intended recipient of the SMS message and to delete the message if the identifier does not match a QoS level associated with the mobile device; and
a display component configured to display SMS messages.

13. The system of claim 12, wherein the destination determination component is further configured to examine a geographic code and to delete the message if the geographic code does not match a geographic code associated with the mobile device.

14. The system of claim 13, wherein the geographic code is a North America Numbering Plan area code.

15. The system of claim 14, wherein the destination determination component includes a component to examine an identifier selected from at least one of an equipment serial number, a mobile equipment identifier, and a mobile directory number, and one or more components to compare the identifier with an identifier associated with the mobile device.

16. The system of claim 15, wherein the display component displays the text message if the SMS message is intended for the mobile device.

* * * * *